Nov. 15, 1960  C. D. BERGER  2,960,606
TEMPERATURE-COMPENSATED INDICATOR
Filed Jan. 18, 1955

INVENTOR
CHRISTIAN D. BERGER

BY Ralph B. Stewart

ATTORNEY

United States Patent Office 2,960,606
Patented Nov. 15, 1960

2,960,606

TEMPERATURE-COMPENSATED INDICATOR

Christian D. Berger, New York, N.Y., assignor to PRD Electronics, Inc., a corporation of New York Filed Jan. 18, 1955, Ser. No. 482,619

6 Claims. (Cl. 250—40)

This invention relates to temperature-compensating devices and in particular to a compensating device capable of introducing linear or non-linear corrections for temperature variations.

The primary object of the invention is to provide an improved temperature-compensating device which is capable of providing a compensating function to match almost any error function.

In accordance with the invention, two relatively rotatable members are connected by means of a temperature-sensitive element adapted to change its radius of curvature with changes in temperature, one end of the temperature-sensitive element being mounted in fixed relation to one of the members, and the other or free end of the temperature-sensitive element being so mounted as to permit movement relative to the other member only along a predetermined path having a radial component with respect to the axis of rotation of the second member. Changes in temperature produce a change in the radius of curvature of the temperature-sensitive element with a resulting movement of the free end thereof. Movement of this free end is transferred to the second member and results in relative rotation between the two members, the magnitude and direction of rotation depending upon the characteristics of the temperature-sensitive element and the slope of the previously mentioned predetermined path.

One embodiment of the invention as applied to an indicating dial is illustrated in the accompanying drawing in which.

Figure 2:
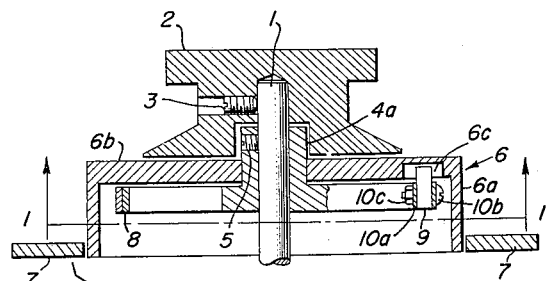
Figure 2 is a sectional view taken along line 2—2 of Figure 1.

This embodiment may be applied to any shaft-operated instrument to which it is desired to apply a temperature correction. For example, it may be applied to a microwave frequency meter M shown diagrammatically in Figure 2 and may be of the type disclosed in the patent issued to Stanley A. Johnson, 2,666,904, in place of the dial 12b shown therein mounted on a shaft or stem 12a. This shaft corresponds to the shaft 1 of the embodiment described herein.

Mounted on one end of a rotatable shaft 1, the angular position of which is to be indicated with a high degree of accuracy, is a knob 2 which is held in fixed relation to shaft 1 by means of a set screw 3. Mounted on the shaft 1 adjacent the knob 2 is radial arm 4 having a cylindrical boss 4a formed on the side of the arm adjacent the knob 2. A set screw 5, threaded into the boss 4a and engaging shaft 1, holds radial arm 4 in fixed relation to the shaft.

Rotatably mounted on the boss 4a between the knob 2 and the radial arm 4 is a dial member 6. This dial member is formed with a drum portion 6a supported by a disc portion 6b. The boss 4a extends through a central aperture in the disc portion 6b and the dial member 6 is free to rotate about the boss 4a and the shaft 1. The periphery of the drum portion 6a has suitable graduations scribed thereon to be used in conjunction with an index mark scribed on the adjacent stationary housing 7.

Dial 6 is connected to turn with the turning of shaft 1 by means of a temperature-sensitive connection which produces relative shifting between the dial and the shaft with changes in temperature. This connection is formed of a bimetallic strip 8 of circular or arcuate form having one end secured to the outer end of arm 4 and the other or free end connected to the dial 6 by way of a pin 9 which projects into a slot 6c formed in the disc portion 6b of the dial. This slot may may be straight or curved, with a slope in a clockwise direction or a counterclockwise direction, as required to produce the desired movement of the dial member 6 upon radial displacement of pin 9 which engages slot 6c.

Pin 9 is mounted on the end of bi-metallic element 8 in any suitable manner such as by a strap 10a, bolt 10b and nut 10c. This end of the bimetallic element 8 is free, under the influence of changes in temperature, to change its position with respect to the other end of the element which is firmly attached to the outer end of the radial arm 4 by means of a bolt 11. Spacers 12 may be used between radial arm 4 and the bi-metallic element 8 to aid in accurately positioning the free end of the bi-metallic element 8 with respect to the axis of rotation of shaft 1 at a specified temperature.

It will be apparent that with changes in temperature, the free end of the bi-metallic element 8 will either move outward and generally away from the fixed end of the element or inward and generally toward the fixed end of the element. Assuming for the moment that the free end of the temperature-sensitive element were constrained to move in a path of constant radius, i.e., were free to move circumferentially but not radially, under these circumstances the circumferential motion of the free end of the temperature-sensitive element would be transferred at a 1:1 ratio to the dial member 6 by means of pin 9 acting against a fixed spot on the walls of slot 6c. This type of action is well known in the prior art and upon careful consideration it will be apparent that the internal stresses set up in the bi-metallic element by constraining the free end to move in a path of constant radius will affect the circumferential motion of the free end of the element to a certain degree. Under some circumstances, the variation in the motion of the free end of the element caused by these internal stresses may be tolerable; in many applications requiring a high degree of accuracy, such a variation will not be acceptable.

Figure 1:
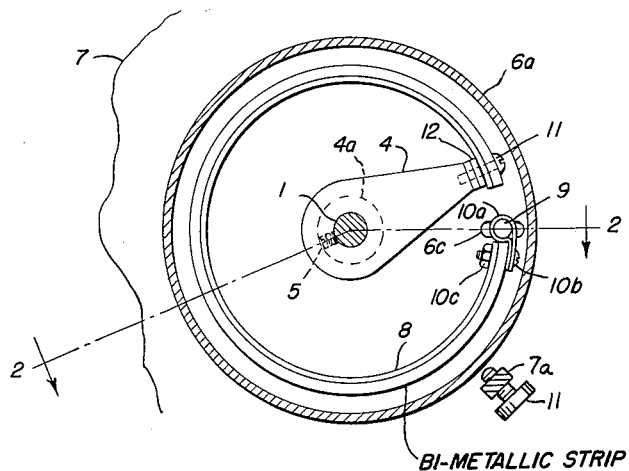
Figure 1 is a sectional view taken along line 1—1 of Figure 2.

The configuration of the slot shown in Figure 1 is suitable for use under circumstances where it is desired to obtain an undistorted response of the bi-metallic element 8 to changes in temperature. The walls of the slot 6c are formed parallel with a radius line of the dial member 6 and allow free movement of the pin 9 in a radial direction while transferring circumferential movement of the free end of the bi-metallic element 8 to the dial member 6.

In some cases, a ratio of transformation of temperature change to rotation of dial member 6 is desired which is not constant but varies with the temperature. In other cases it may be desirable to retain a linear correction but either decrease or increase the coefficient of correction. This last-mentioned result could be accomplished by re-designing the temperature-sensitive element, but other considerations such as interchangeability, ruggedness, or cost may make this course undesirable. My invention makes it possible to obtain a compensating function for practically any error function, and also to accomplish this with ease and a minimum of parts.

Figure 3:
Figure 3 is a fragmentary view, on an enlarged scale, of a modified configuration.

Figure 3 shows a configuration of the slot 6c which may be used to maintain a linear coefficient while changing its value. Here it will be seen that the outward radial component of motion of pin 9 which accompanies the circumferential motion in a clockwise direction will, in acting against the inclined walls of slot 6c, tend to produce a rotation of dial member 6 in a counterclockwise direction, thus reducing the total rotation of dial member 6 for any given change in temperature. By inclining the slot 6c in the opposite direction, the rotation of dial member 6 for any given change in temperature would be increased.

Figure 4:
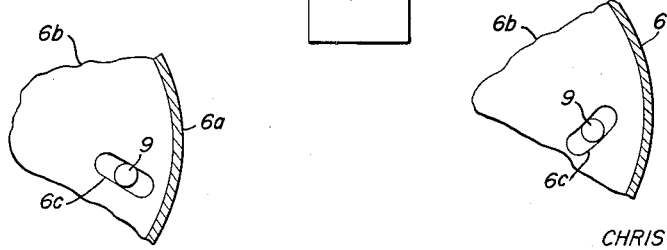
Figure 4 is a fragmentary view, on the same enlarged scale of a second modified configuration.

Figure 4 shows a configuration of slot 6c which may be used to produce a correction which varies with the temperature. The curved slot in this case is formed so that the radial component of motion of pin 9 is used to produce an augmentation of the rotation of dial member 6 which is greater at the high end of the temperature range than at the low end.

While the invention has been described particularly in connection with an indicating dial, it is capable of other applications as well as variations on the application described. For instance, it may be used to compensate devices which have no indicating dial associated therewith. Alternatively, provision may be made to clamp dial 6 in a desired position, as by means of a clamping screw 11 threaded through a post 7a (see Figure 1) and bearing against the dial 6. In this case any changes in temperature would result in the rotation of shaft 1 rather than the dial member 6. This arrangement is particularly useful where the shaft 1 controls the tuning element of a resonant circuit embodied in meter M which tends to change its resonant frequency with changes in temperature. By suitable design of the components, and especially of slot 6c, the shaft 1 may be made to rotate the correct amount required to compensate for frequency changes due to changes in temperature, and thereby maintain a substantially constant resonant frequency.

It will be seen that the slot 6c provides a cam surface forming a track for pin 9 and converts movement of the pin into relative rotary movement between the dial and the shaft. In all forms, the cam surface of the slot converts circumferential movement of the pin into rotary movement of the dial, or of the shaft. Where the slot is inclined to the radius, as in Figures 3 and 4, radial movement of the pin is converted into rotary movement of the dial or of the shaft.

I claim:

1. A temperature-compensated indicator comprising, a shaft member mounted for rotation about its axis, an indicating member for indicating the angular position of said shaft, means mounting said indicating member for turning about the axis of said shaft independently of the rotation of said shaft, and an arcuate, temperature-sensitive element arranged concentrically with said shaft, means rigidly connecting one end of said temperature-sensitive element to one of said members, and cam means extending in a direction having a radial component carried by the other member in engagement with the free end of said temperature-sensitive element and providing a driving connection for transmitting rotary movement between said members while permitting radial movement of the free end of said temperature-sensitive element.

2. A temperature-compensated indicator comprising, a shaft mounted for rotation about its axis, a radial arm fixed to said shaft, a dial member rotatably mounted on said shaft and having a slot with a radial direction component formed therein, an arcuate, temperature-sensitive element having one end fixed to the outer end of said arm, and a pin mounted on the other end of said temperature-sensitive element, said pin engaging said slot and being slidable therein upon movement of the free end of said temperature-sensitive element with changes in temperature.

3. A temperature-compensated indicator in accordance with claim 1 and including means to hold said indicating member fixed in an adjusted position, whereby movement of the free end of said temperature-sensitive element results in rotation of said shaft member.

4. A temperature-compensated indicator according to claim 3 and including a tuned circuit having a tuning element controlled by said shaft, and said temperature-sensitive element rotates said shaft in a direction to maintain the resonant frequency of said circuit substantially constant.

5. A temperature-compensating device for changing the relative angular position of two relatively rotatable and co-axially mounted members comprising, a temperature-sensitive element of arcuate form, means holding one end of said temperature-sensitive element in fixed relation with one of said members, and the second end thereof being movable relative to the other member and radially of the axis of rotation of said members, and cam means comprising a cam and follower establishing a sliding connection between the other end of said temperature-sensitive element and said other member for translating radial movement of the second end of said temperature-sensitive element into relative angular movement between said two members.

6. A temperature-compensated indicator comprising, a shaft member mounted for rotation about its axis, an indicating member for indicating the angular position of said shaft, means mounting said indicating member for turning about the axis of said shaft independently of the rotation of said shaft, and an arcuate, temperature-sensitive element arranged concentrically with said shaft, means rigidly connecting one end of said temperature-sensitive element to one of said members, and cam means carried by the other member and engaging the free end of said temperature-sensitive element and providing a driving connection for transmitting rotary movement between said members while permitting radial movement of the free end of said temperature-sensitive element, said other member being the indicating member and having a slot formed therein with a radial direction component and including a radial arm mounted on said shaft, one end of said temperature-sensitive element being secured to said arm, and a pin mounted on the opposite end of said temperature-sensitive element and engaging said slot.

References Cited in the file of this patent

UNITED STATES PATENTS

| Number | Name | Date |
| --- | --- | --- |
| 356,761 | Haight | Feb. 1, 1887 |
| 1,539,452 | Wilson | May 26, 1925 |
| 1,952,626 | Johnson | Mar. 27, 1934 |
| 1,995,497 | Carlson | Mar. 26, 1935 |
| 2,087,488 | Stanley | July 20, 1937 |
| 2,246,878 | Davis | June 24, 1941 |
| 2,439,809 | Hunter | Apr. 20, 1948 |

FOREIGN PATENTS

| 97,054 | Sweden | Oct. 10, 1939 |